(12) United States Patent
Yamaguchi et al.

(10) Patent No.: US 6,228,800 B1
(45) Date of Patent: May 8, 2001

(54) NOBLE METAL SUPPORT (75) Inventors: Tatsuo Yamaguchi, Ihara-Gun; Setsuo Yamamatsu, Fuji; Hiroshige Okamoto, Okayama, all of (JP)

(73) Assignee: Asahi Kasei Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/308,838

(22) PCT Filed: Dec. 16, 1997

(86) PCT No.: PCT/JP97/04624

§ 371 Date: May 26, 1999

§ 102(e) Date: May 26, 1999

(87) PCT Pub. No.: WO98/26867

PCT Pub. Date: Jun. 25, 1998

(30) Foreign Application Priority Data

Dec. 16, 1996 (JP) .................................................. 8-335817

(51) Int. Cl.[7] .............................. B01J 23/44; B01J 23/02; B01J 23/10; C07C 67/30
(52) U.S. Cl. .......................... 502/339; 502/302; 502/303; 502/304; 502/325; 502/328; 502/330; 502/332; 502/333; 502/339; 502/232; 502/240; 502/243; 502/245; 502/262; 502/527.24; 560/206; 560/207; 560/208; 560/218; 560/261
(58) Field of Search ..................................... 502/302, 303, 502/304, 325, 328, 330, 332, 333, 339, 232, 240, 243, 245, 262, 527.24; 560/206, 207, 208, 218, 261

(56) References Cited

U.S. PATENT DOCUMENTS

| | | | | |
|---|---|---|---|---|
| 3,819,533 | * | 6/1974 | Whitman et al. | 502/245 |
| 4,404,124 | * | 9/1983 | Johnson et al. | 502/330 |
| 5,648,576 | * | 7/1997 | Nguyan Than et al. | 585/260 |
| 5,955,397 | * | 9/1999 | Didillon et al. | 502/339 |

FOREIGN PATENT DOCUMENTS

| | | |
|---|---|---|
| 1521652 | 8/1978 | (GB) . |
| 59-120250 | 7/1984 | (JP) . |
| 60-202745 | 10/1985 | (JP) . |
| 2-478626 | 12/1992 | (JP) . |
| 8-332383 | 12/1996 | (JP) . |

OTHER PUBLICATIONS

Tzong–Bin Lin et al, Applied Catalysis 1994 Elsevier Secience B V (6 pages) No Month Available.

* cited by examiner

Primary Examiner—Elizabeth D. Wood
(74) Attorney, Agent, or Firm—Birch, Stewart, Kolasch & Birch, LLP

(57) ABSTRACT

A noble metal-supported article which comprises a carrier and a palladium-containing metal component supported on the carrier, which article has (A) a layer in which substantially no palladium is supported in the interior of the carrier and (B) a layer in which palladium is supported in the region from the outer surface to a depth of less than 100 $\mu$m of the carrier.

11 Claims, 3 Drawing Sheets

NOBLE METAL SUPPORT

This application is the national phase under 35 U.S.C. § 371 of PCT International Application No. PCT/JP97/04624 which has an International filing date of Dec. 16, 1997, which designated the United States of America.

DESCRIPTION

1. Technical Field

This invention relates to a metal-supported article in which a palladium-containing metal component is supported on a carrier, a process for producing the above metal-supported article and a catalyst for chemical reaction composed of the above metal-supported article.

2. Background Art

Palladium or a palladium metal compound has been widely used as a catalyst in industry for many years.

The term "palladium metal compound" used herein is meant to include palladium intermetallic compounds in which the lattice of palladium is replaced with diverse metal and palladium alloys wherein the palladium and diverse metal form a solid solution.

Palladium has been used alone as a catalyst; however, in general, palladium is used in the form of a dispersion on a carrier because palladium is expensive and in view of the purpose of realizing a high reactivity. In chemical industry processes, a palladium-supported catalyst has been widely used in various reactions such as oxidation reactions, reduction reactions, hydrogenation reactions and the like and in catalysts for purging an automobile exhaust or the like. Palladium is supported on various carriers depending upon the reaction characteristics and uses. With a catalyst in which a noble metal component is uniformly supported even in the interior of the carrier, the diffusion of reactants and reaction product can be prevented by the resistance of fine pores in the interior of the carrier. In this case, it follows that the catalyst components supported in the interior of the carrier are not effectively utilized. Moreover, in some kinds of reactions, some types of reactors and the like, the catalyst components supported on the particle surface of a carrier are deactivated because their active sites are covered as a result of adsorption of reaction by-products, accumulation of poisoned substances and the like, or the carrier particles are cut by abrasion due to collision of the carrier particles with one another or with wall surfaces or the like. As a result, the active components of the catalyst are lost, and the catalyst is deactivated. Therefore, for the purpose of prolonging the life of the catalyst while maintaining its reaction activity, it has been proposed for a long time that the active components of the catalyst be supported slightly inside the carrier surface without being distributed on the outer surface of the carrier. As the catalyst preparation method as mentioned above, there has been known an impregnation method, an ion-exchange method, a chemical reaction method (for example, soluble palladium is insolubilized by reaction and deposited on a carrier) or the like.

An example in which the distribution of a palladium component on a carrier has been changed is reported in the Journal of Chemical Society of Japan (4), pp. 261–268 (1990). It is reported therein that when spherical alumina having a particle diameter of 3 mm (3,000 $\mu$m) is used as a carrier and palladium dissolved in hydrochloric acid is allowed to be adsorbed thereon by ion exchange, the palladium distribution and the amount of palladium supported are varied with adsorption time, for example, after one minute, after 25 minutes, after one hour, after 12 hours and after 20 hours, and the adsorption reaches approximately equilibrium in about one hour. However, even when the adsorption time is one minute, substantially no palladium is distributed from the outer surface of the carrier to a depth of about 300 $\mu$m and palladium is distributed in the form of a belt in a width of about 150 $\mu$m from the said about 300-$\mu$m depth in the direction of the carrier interior. Furthermore, the amount of palladium supported is increased with the lapse of time and palladium is uniformly distributed throughout the carrier after at least one hour. In said publication, there is no statement of a case of within one minute; however, when it is taken into consideration that after one minute, substantially no palladium is present in the area from the outer surface to a depth of about 300 $\mu$m of carrier and palladium is distributed in the form of a belt in a width of about 150 $\mu$m from said 300-$\mu$m depth in the direction of the carrier interior, it is actually difficult to control the distribution by this method so that the palladium is allowed to be substantially present within the very narrow range from the outer surface to a depth of 100 $\mu$m of carrier. Also, an example of the preparation of a catalyst in which silica gel is used as a carrier and palladium ions and ammonium ions are allowed to coexist is known, but in this case, palladium is uniformly supported in the carrier particles.

No palladium-supported article in which palladium is present only in the very narrow range from the outer surface to a depth of 100 $\mu$m in the carrier has been known.

DISCLOSURE OF INVENTION

This invention aims at providing a supported article in which the distribution of palladium in a carrier is controlled and Pd is allowed to be selectively present in a specific range in order to effectively utilize the noble metal Pd supported on a carrier. This invention also provides a highly active palladium-supported article by allowing palladium to be present in the vicinity of the surface of a carrier but not to be present in the interior of the carrier. In addition, this invention is directed to a noble metal-supported composition having a long catalyst life by further providing a layer in which no palladium is present as the outermost layer when accumulation of substances which would poison the catalyst and the loss of the active components due to abrasion may be encountered.

The present inventors have conducted research on supported catalysts and the reaction characteristics thereof based on many reaction examples. In many cases in which expensive noble metal components such as palladium and the like are used as the catalyst components, it is essential to support the catalyst components on a carrier. The present inventors have found that it is effective to support palladium in such a way that the reactants can react instantly. That is to say, when the diffusion rate of the reactants in the fine pores of the carrier affects the reaction rate, the inventors have found that it is effective to provide a catalyst wherein the distribution of a noble metal component, such as palladium or the like is as close as possible to the outer surface of the carrier, and no noble metal component is present in the center portion of the carrier where the influence of the diffusion is great. In addition, in a palladium-containing metal-supported article effective for heavy oil reformation, reactions is which the accumulation of poisoned substances takes place such as in a combustion catalyst or the like or in the case in which abrasion of catalyst particles is possible as in a fluidized bed, a bubble column, a stirring type reactor or the like, the inventors have found that the durability of the catalyst can be greatly improved without causing a reduction of reaction activity by supporting a noble metal component wherein a thin layer free from palladium is used as the outermost layer with the catalyst particle. If the durability can be improved without reducing the reaction activity, the catalyst life could be greatly prolonged and the economics could be improved. Heretofore, no technique for obtaining a metal-supported article in which a noble metal component is distributed in a very thin layer of less than 100 microns or technique for obtaining a metal-supported article which has a very thin layer substantially free from palladium-containing metal on the surface without reducing the reaction activity and wherein the palladium is supported in the surface layer having a thickness of less than 100 microns but is not present in the interior have bee known in the art.

Thus, the present invention is directed to a method for precisely controlling the vicinity of the surface of a carrier for palladium- or a palladium metal compound-supported catalyst.

The invention comprises the following:

(1) A noble metal-supported article which comprises a carrier and a palladium-containing metal component supported on the carrier and which article has (A) a layer in which substantially no palladium is supported in the interior of the carrier and (B) a layer in which palladium is supported in the region from the outer surface to a depth of less than 100 $\mu$m of the carrier.

(2) The noble metal-supported article according to (1) above, which has (A1) a layer in which substantially no palladium is supported on the outer surface of the carrier and has (A2) a layer in which substantially no palladium is supported in the center portion of the carrier.

(3) The noble metal-supported article according to (1) or (2) above, wherein the thickness or particle diameter of the carrier is not less than 200 $\mu$m.

(4) The noble metal-supported article according to (1) or (2) above, wherein the thickness or particle diameter of the carrier is less than 200 $\mu$m and which article has the layer (B) in which palladium is supported in the region from the outer surface to a depth of less than 80 $\mu$m of the carrier.

(5) The noble metal-supported article according to any one of (1) to (4) above, wherein the palladium-containing metal component is palladium or the palladium metal compound.

(6) The noble metal-supported article according to (5) above, wherein the palladium metal compound is a palladium-lead intermetallic compound.

(7) The noble metal-supported article according to (5) above, wherein the palladium metal compound is a palladium-bismuth intermetallic compound.

(8) A process for producing the noble metal-supported article according to any one of (1) and (3) to (7) above, which comprises instantly introducing a dried and/or calcined carrier containing a basic metal salt component of at least one metal selected from the group consisting of alkali metals, alkaline earth metals and rare earth metals into a palladium compound solution maintained at a temperature of not less than 70° C.

(9) A process for producing the noble metal-supported article according to any one of (2) to (7) above, which comprises instantly introducing a dried and/or calcined carrier containing a basic metal salt component of at least one metal selected from the group consisting of alkali metals, alkaline earth metals and rare earth metals into an aluminum compound solution maintained at a temperature of not less than 70° C. and thereafter momentarily introducing the resulting mixture into a palladium compound solution, or alternatively momentarily introducing the above dried and/or calcined carrier into a solution of a mixture of an aluminum compound and a palladium compound.

(10) A process for producing the noble metal-supported article according to any one of (1) and (3) to (7) above, which comprises dispersing a dried and/or calcined carrier containing a basic metal salt component of at least one metal selected from the group consisting of alkali metals, alkaline earth metals and rare earth metals in a solution containing a salt of at least one metal selected from the group consisting of alkali metals, alkaline earth metals and rare earth metals and then contacting the resulting dispersion with a palladium compound solution at a temperature of not less than 70° C.

(11) A process for producing the noble metal-supported article according to any one of (1) to (7) above, which comprises dispersing a dried and/or calcined carrier containing a basic metal salt component of at least one metal selected from the group consisting of alkali metals, alkaline earth metals and rare earth metals in a solution containing a salt of at least one metal selected from the group consisting of alkali metals, alkaline earth metals and rare earth metals and then contacting the resulting dispersion firstly with an aluminum compound solution at a temperature of not less than 70° C. and secondly with a palladium compound solution at a temperature of not less than 70° C., or alternatively contacting the above dispersion with a solution of a mixture of a palladium compound and an aluminum compound at a temperature of not less than 70° C.

(12) A process for producing an acrylic acid ester and/or a methacrylic acid ester, which comprises reacting an alcohol with acrolein and/or methacrolein in the presence of oxygen using the noble metal-supported article according to any one of (1) to (7) above as a catalyst.

Since in the noble metal-supported article of this invention, palladium is allowed to be present in a region effective for the reaction in the carrier, the catalytic activity is high and the expensive noble metal can be utilized effectively. In addition, by providing a palladium-unsupported layer as the outermost layer, it becomes possible to utilize the noble metal-supported article in many reactions as a catalyst which has a long life and is highly resistive to poisoning and abrasion. Moreover, by providing a palladium component-free layer controlled to a very thin thickness on the surface of the carrier, a great reduction of catalytic activity can be prevented.

BEST MODE FOR CARRYING OUT THE INVENTION

This invention relates to a noble metal-supported article in which palladium is supported only in a specific region of a carrier in order to efficiently and effectively utilize palladium and which article has a layer in which substantially no palladium is supported in the interior of the carrier. Moreover, it relates to a noble metal-supported article in which palladium is supported on a carrier in a manner that palladium is distributed and supported only in a specific region of the carrier and which article has layers in which no palladium is supported in both the outermost portion and the interior of the carrier. Hereinafter, the layer in which substantially no palladium is supported is referred to as the palladium-unsupported layer or merely as the unsupported layer in some cases. Furthermore, the layer in which palladium is supported is hereinafter referred to as the palladium-supported layer or merely as the supported layer in some cases.

As to the thickness of the palladium that is supported and the thickness of the layer in which no palladium is supported, the optimum ranges are selected depending upon the thickness or particle diameter of the carrier. However, it is possible to separate the case where the thickness or particle diameter of the carrier is not less than 200 $\mu$m from the case where the thickness or particle diameter of the carrier is less than 200 $\mu$m and to define the pertinent range in each of these cases.

For example, a large carrier having a particle diameter of not less than 200 $\mu$m, for example, several millimeters or more is generally used in a liquid phase reaction in which the reaction is relatively slow or in a gas phase reaction. Accordingly, a catalyst which is hardly affected by the diffusion rate of the reactants can be prepared by supporting a catalyst component participating in the reaction such as palladium or the like in the range of from the surface to a depth of less than 100 $\mu$m of carrier and providing a layer in which no palladium is supported in the interior of the carrier. Consequently, it follows that palladium can be efficiently utilized.

On the other hand, when small particles having a particle diameter of less than 200 $\mu$m are used as a carrier, particularly when the noble metal-supported article obtained is used in a liquid phase reaction, the influence of reaction rate and diffusion rate of reactant in the fine pores in the interior of the carrier appears, so that such a design has heretofore been made that the particle diameter is made small according to the reaction. In this invention, by making the palladium-supported layer thin, a highly active catalyst can be obtained without making the particle diameter small. That is to say, this invention is advantageous in that the separation of catalyst by settling becomes easy and the separation by use of a separator having a small volume is made possible. However, when the volume of the portion in which no palladium is supported in the supported article becomes too large, the volume unnecessary for the reaction per reactor becomes large and a useless portion is caused in the supported article in some cases. Therefore, it is preferable to set the particle diameter of carrier according to the type of reaction and set the necessary thickness of the palladium-supported layer and the necessary thickness of the layer in which no palladium is supported.

In the case of a carrier having a particle diameter of less than 200 $\mu$m, it is preferable to distribute palladium in the region from the surface to a depth of 80 $\mu$m of carrier. Moreover, when a layer in which substantially no palladium is supported is provided in the region from the outer surface to the specified depth of carrier, it is preferable to provide a layer in which substantially no palladium is supported in the region from the outer surface to a depth of 30 $\mu$m of carrier and to form a layer in which palladium is supported at a depth of 30 to 80 $\mu$m from the surface. When abrasion is highly possible and the diffusion rate in the interior of the carrier is small, it is preferable in some cases to provide a layer in which substantially no palladium is supported in the region from the outer surface to a depth of 10 $\mu$m of carrier and to form a layer in which palladium is supported at a depth of 10 to 25 $\mu$m from the surface. On the other hand, when there is no abrasion but the influence of the diffusion rate in the fine pores is a problem, the palladium component can be effectively used by supporting palladium in a narrower region of 10 $\mu$m in width in the vicinity of the carrier surface.

When the particle diameter of the carrier is made smaller, namely not more than 10 $\mu$m, the influence of diffusion is lessened and hence the effect of this invention becomes small in some cases. However, since it is possible to provide the unsupported layer as the outermost layer of not more than 1 $\mu$m in thickness, a great improvement effect on durability can be expected. It is preferable to set, in the carrier, the palladium-supported layer, the layer in which substantially no palladium is supported in the region from the outer surface to the specified depth and the unsupported layer in the interior based on the purpose and reaction characteristics, select the optimum construction thereof and then utilize the resulting palladium-supported article.

In this invention, the term "substantially no palladium is supported" means that substantially no peak showing a palladium distribution of a relative intensity of not less than 10% is present in the conventional X-ray microprobe analytical method as stated hereinafter or in the secondary electron reflection image of a scanning type electron microscope of a high resolving power.

In this invention, carriers having such various sizes that the substantial thickness or particle diameter is in the order of from $\mu$m to mm or cm and having various shapes can be utilized. Specific examples of the carrier shape include spheres, ellipsoids, columns, tablets, hollow columns, plates, bars, sheets, honeycombs and the like. The carrier shape can be appropriately varied depending upon the reaction type, and in, for example, a fixed bed reaction, a shape which gives only a small pressure loss such as a hollow column, honeycomb or the like is selected, and under liquid phase slurry suspension conditions, a spherical shape is generally selected.

The kind of carrier used in this invention is not critical as far as it is a conventional carrier such as silica gel, alumina, activated carbon, silica-alumina, silica-alumina-magnesia, zeolite, crystalline metasilicate or the like or a porous material having pores in the order of a nanometer. Generally, when a large surface area of carrier is required, for example, activated carbon is used, while when a mechanical strength is required, for example, alumina, silica-alumina, silica-alumina-magnesia, zeolite, crystalline metasilicate and the like are used. Thus, the noble metal-supported article of this invention can be produced by varying the shape and kind of carrier according to the purpose of utilization.

In this invention, a basic metal salt component of at least one metal selected from the group consisting of alkali metals such as Li, Na, K, Rb, Cs and the like; alkaline earth metals such as Be, Mg, Ca, Sr, Ba and the like and rare earth metals such as La, Ce, Pr and the like is previously supported on a carrier. As the basic metal salt component, those which are converted into oxides by an operation such as calcination or the like, for example, nitric acid salts, acetic acid salts and the like are preferred.

The carrier used in this invention is obtained, for example, by supporting a soluble salt of at least one metal selected from the group consisting of alkali metals, alkaline earth metals and rare earth metals on a carrier such as silica gel, alumina, activated carbon, silica-alumina, zeolite, crystalline metasilicate or the like by impregnation, adsorption or the like, and then subjecting the same to drying and calcination. Also, a silica gel having an enhanced degree of dispersion of at least one metal selected from the group consisting of alkali metals, alkaline earth metals and rare earth metals can be obtained by uniformly dispersing a soluble salt of at least one metal selected from the group consisting of alkali metals, alkaline earth metals and rare earth metals in a silica sol solution and spray-drying the resulting dispersion, and then calcining the dried dispersion. Silica-alumina in which at least one metal selected from the group consisting of alkali metals, alkaline earth metals or rare earth metals are dispersed can be obtained by dispersing a soluble salt of at least one metal selected from the group consisting of alkali metals, alkaline earth metals and rare earth metals in a silica and alumina sol solution, spray-drying the resulting dispersion and then calcining the dried dispersion. Silica-alumina in which at least one metal selected from the group consisting of alkali metals, alkaline earth metals and rare earth metals is dispersed can be obtained by dispersing a soluble salt of at least one metal selected from the group consisting of alkali metals, alkaline earth metals and rare earth metals in a silica-alumina sol, spray-drying the resulting dispersion and then calcining the dried dispersion. Silicaalumina-magnesia containing at least one metal selected from the group consisting of alkali metals, alkaline earth metals and rare earth metals can be obtained by dissolving and dispersing soluble salts of magnesium and aluminum such as magnesium nitrate, aluminum nitrate and the like in a silica sol solution, further uniformly dispersing a soluble salt of at least one metal selected from the group consisting of alkali metals, alkaline earth metals and rare earth metals therein, thereafter spray-drying the resulting dispersion and then calcining the dried dispersion.

The drying of the carrier on which a basic metal salt component of at least one metal selected from the group consisting of alkali metals, alkaline earth metals and rare earth metals has been supported is conducted at a temperature of not less than 100° C., preferably not less than 110° C., for 1–48 hours. The calcination is conducted at a temperature of 300–800° C., preferably 300–700° C., more preferably 450° C., for 1–48 hours.

In the production of the noble metal-supported article of this invention, any carrier obtained by previously supporting thereon a basic metal salt component of at least one metal selected from the above-mentioned alkali metals, alkaline earth metals and rare earth metals and drying and/or calcining the same can be used.

The palladium compound used in this invention includes soluble salts of palladium such as palladium chloride, palladium acetate and the like, and palladium chloride is particularly preferred.

Since palladium chloride is not completely dissolved in water, it is usual to sufficiently dissolve palladium in an aqueous hydrochloric acid solution or an aqueous sodium salt solution to prepare a palladium chloride solution.

As the aluminum compound solution used in this invention, an aqueous solution of a soluble aluminum salt such as aluminum chloride, aluminum nitrate or the like is used.

The production process of this invention is based on the principle that the palladium component is insolubilized and immobilized by a chemical reaction between the soluble palladium compound and the basic metal salt component of at least one metal selected from the group consisting of alkali metals, alkaline earth metals and rare earth metals previously supported on a carrier.

Moreover, the production process of this invention in which a palladium-unsupported layer is formed as the outermost layer is also based on the above-mentioned principle of insolubilization and immobilization. First of all, as the aluminum compound, a soluble aluminum salt such as aluminum chloride, aluminum nitrate or the like is used, and aluminum is allowed to react with the carrier on its outer surface through a chemical reaction between the soluble aluminum salt and a basic metal salt component of at least one metal selected from the group consisting of alkali metals, alkaline earth metals and rare earth metals, thereby consuming the reaction sites of palladium, and the basic metal salt component of at least one metal selected from the group consisting of alkali metals, alkaline earth metals and rare earth metals in the interior and the palladium component in the interior are immobilized by reaction.

The amount of the aluminum component is varied depending upon the thickness of the layer in which the palladium-containing metal component is not supported and determined based on the amount of the basic metal salt component of at least one metal selected from the group consisting of alkali metals, alkaline earth metals and rare earth metals previously supported on the carrier. Usually, it is 0.001 to 2 moles, preferably 0.005 to 1 mole, per mole of the basic metal salt component of at least one metal selected from the group consisting of alkali metals, alkaline earth metals and rare earth metals previously supported on the carrier.

There are many unclear points on the details of the mechanism by which the palladium distribution of this invention is achieved; however, the present inventors have inferred that the diffusion rate of the palladium-containing soluble component in the carrier interior and the insolubilization rate of said component by a chemical reaction are well balanced, whereby it has been made possible to immobilize palladium in a very narrow region in the vicinity of the carrier surface. Moreover, when the carrier has on its outer surface a layer in which substantially no palladium is present, the present inventors have inferred that when aluminum is allowed to react with the basic metal salt component in the vicinity of the outer surface of the carrier to consume the basic metal salt component capable of reacting with the palladium component in the vicinity of the outer surface of the carrier, and subsequently, palladium is supported, palladium reacts with the basic metal salt component in the carrier interior because the reactive basic metal salt component in the vicinity of the outer surface of the carrier has already been consumed, whereby the palladium is immobilized in the carrier interior.

The noble metal-supported article of this invention can be obtained by momentarily introducing a carrier obtained by previously dispersing therein a basic metal salt component of at least one metal selected from the group consisting of alkali metals, alkaline earth metals and rare earth metals and subjecting the carrier to drying and/or calcination, into a solution of a palladium compound such as palladium chloride or the like maintained at a temperature of not less than 70° C.

The noble metal-supported article of this invention which also has the unsupported layer as the outermost layer can be obtained by instantly introducing a carrier obtained by subjecting a basic metal salt component of at least one metal selected from the group consisting of alkali metals, alkaline earth metals and rare earth metals to previous dispersion and then to drying and/or calcination, into an aluminum solution maintained at not less than 70° C. to allow the carrier to react with the aluminum to form a surface layer in which substantially no palladium is supported, and subsequently contacting a solution of a palladium compound such as palladium chloride or the like with the carrier at not less than 70° C. The supported article thus obtained has the palladium-unsupported layer as the outermost layer and the thickness of the supported layer is less than 100 μm.

The production process of this invention utilizes immobilization due to chemical reaction and the reaction is completed in a short time, and hence, is an epoch-making process which, unlike support obtained by means of ion-exchange, does not require the carrier introduced into a reactant solution to be taken out from the reaction mixture in a short time after the introduction, enables the palladium-supported layer and the palladium-unsupported layer to be sharply controlled with a good precision, and enables palladium to be supported on a carrier in a manner that the palladium distribution deviates in the direction of the vicinity of the surface. Upon introducing the carrier into the palladium compound solution or aluminum compound solution, this compound reacts with such a component as an alkali metal or the like in the vicinity of the carrier surface so as to be insolubilized and immobilized, whereby the palladium-supported layer and the palladium-unsupported layer are formed. Accordingly, when this insolubilization-immobilization reaction is slow, the palladium or aluminum component diffuses in the fine pores of the carrier to its center portion and it follows that the palladium-supported layer or palladium-unsupported layer on the surface is broadened.

That is to say, in one mode of the production process of this invention, each of the following conditions is satisfied: (i) The temperature of the palladium compound solution is maintained at not less than 70° C. (ii) A carrier having previously dispersed therein a basic metal salt component of at least one metal selected from the group consisting of alkali metals, alkaline earth metals and rare earth metals is subjected to drying and/or calcination and then used. (iii) The dried and/or calcined carrier is added to a palladium compound solution. (iv) The carrier is instantly added to a palladium compound solution.

Moreover, when the palladium-unsupported layer is provided as the outermost layer, each of the following conditions is satisfied: (i) The temperature of the aluminum compound solution is maintained at not less than 70° C. (ii) A carrier having previously dispersed therein a basic metal salt component of at least one metal selected from the group consisting of alkali metals, alkaline earth metals and rare earth metals is subjected to drying and/or calcination and then used. (iii) The dried and/or calcined carrier is added to an aluminum compound solution. (iv) 1) The carrier is momentarily added to an aluminum compound solution, and then a palladium compound solution maintained at a temperature of not less than 70° C. is momentarily added thereto, or 2) the carrier is momentarily added to a solution of a mixture of an aluminum compound and a palladium compound.

The reaction temperature in (i) above is one of the control factors and is varied depending upon the amount of the basic metal salt component of at least one metal selected from the group consisting of alkali metals, alkaline earth metals and rare earth metals previously supported on the carrier; however, when the temperature is too low, the reaction becomes slow and the metal distribution is broadened. In the production of the noble metal-supported article of this invention, the temperature is preferably so high that a high reaction rate is obtained in order to obtain a sharp layer. It is important that the temperature is not less than 70° C., and the temperature is preferably not less than 80° C., more preferably not less than 90° C. The reaction can be effected at a temperature not lower than the boiling point of the solution under pressure, but it is usually preferable to conduct the reaction at a temperature not higher than the boiling point for facilitating the operation.

It is necessary to use a carrier in which a basic metal salt component of at least one metal selected from the group consisting of alkali metals, alkaline earth metals and rare earth metals has previously been dispersed. In the production process of this invention, by the insolubilization-immobilization reaction between the basic metal salt component and aluminum and palladium, the palladium-unsupported layer is provided on the carrier surface and palladium is immobilized in the interior of the carrier. Furthermore, the carrier must previously be subjected to drying and/or calcination before its use. The fine pores of the carrier which have been subjected to drying and/or calcination are filled with a gas component such as air or the like and this gas component prevents the palladium compound solution and aluminum compound solution from diffusing to the center portion of the carrier through the fine pores. This is believed to be one of the factors for making the distribution sharp.

As in (iii) above, it is necessary to add the dried and/or calcined carrier to the palladium compound solution or the aluminum compound solution. By previously dispersing the carrier in only water or the like and then adding thereto the palladium compound solution or the aluminum compound solution, it is also possible to obtain the noble metal-supported article having a relatively sharp distribution of the palladium-supported layer and the palladium-unsupported layer as far as the above (i), (ii) and (iv) conditions are satisfied. However, a part of the base component in the carrier is dissolved in the liquid in some cases, whereby the deterioration of liquid properties and the deterioration of operability are caused in some cases. Therefore, such an addition method is not desirable.

As stated in (iv) above, the introduction of the carrier is effected instantly. When the introduction of the carrier is conducted over a long period of time, it follows that there is obtained a mixture of carriers having various distribution states which are probably due to the time history needed for the introduction. In this invention, the term "instantly" means that the time needed for introducing the carrier is within 15 seconds, preferably within 10 seconds though it may be varied depending upon the thickness and particle diameter of the carrier introduced. It is more preferable to bring the time of introduction as close to zero seconds as is possible.

Another example of a production process of this invention in which aluminum or both aluminum and a palladium solution are added to a carrier slurry is shown below.

In this mode of the production process of the invention, each of the following conditions is satisfied: (i) A solution of a salt of at least one metal selected from the group consisting of alkali metals, alkaline earth metals and rare earth metals is maintained at a temperature of not less than 70° C. (ii) A dried and/or calcined carrier in which a basic metal salt component of at least one metal selected from the group consisting of alkali metals, alkaline earth metals and rare earth metals has previously been dispersed is instantly added to the solution mentioned in (i) above to prepare a slurry. (iii) A palladium compound solution is instantly added to the slurry.

Furthermore, the palladium-supported article having the palladium-unsupported layer as the outermost layer can be obtained by (i) maintaining a solution of a salt of at least one metal selected from the group consisting of alkali metals, alkaline earth metals and rare earth metals at a temperature of not less than 70° C., (ii) instantly adding to the solution of (i) above a dried and/or calcined carrier in which a basic metal salt component of at least one metal selected from the group consisting of alkali metals, alkaline earth metals and rare earth metals has previously been dispersed to prepare a slurry, and thereafter (iii) momentarily adding to the slurry an aluminum compound solution and then a palladium compound solution or a mixed solution of the aluminum compound solution and the palladium compound solution.

As the salt of at least one metal selected from the group consisting of alkali metals, alkaline earth metals and rare earth metals used in the above step (i), there is used at least one member selected from the group consisting of organic acid salts, inorganic acid salts, hydroxides and the like of the above metals; however, acetic acid salts and nitric acid salts which are converted into oxides upon calcination are preferable.

In addition, since in the noble metal-supported article of this invention, an aluminum ion and a palladium ion are allowed to react with at least one metal selected from the group consisting of alkali metals, alkaline earth metals and rare earth metals, the amount of the basic metal salt component of at least one metal selected from the group consisting of alkali metals, alkaline earth metals and rare earth metals dispersed and immobilized in the carrier is varied depending upon the thickness of the palladium-unsupported layer on the surface of the carrier or the amount of palladium to be supported on the carrier; however, it is selected from the range of from 1 to 100 moles, preferably from 2 to 50 moles, per mole of the palladium supported.

In the production process of this invention, the amount of the carrier used is usually 5 to 200 times the amount of palladium supported.

Next, a method of preparing a metallic palladium-supported article by subjecting a supported article in which a palladium compound is immobilized in a reduction operation is described. The metallic palladium-supported article can be obtained by dispersing the supported article in which a palladium component is dispersed and immobilized, in an aqueous solution or the like, and then subjecting the resulting dispersion with stirring to reduction treatment using formalin, formic acid, hydrazine, methanol, hydrogen gas or the like.

As described above, according to the process of this invention, it has, for the first time, become possible to obtain a palladium-supported article which has a palladium-supported layer in a specific shallow region in the vicinity of the outer surface of the carrier and which further has a layer in which no palladium is supported on the outer surface of the carrier.

Furthermore, according to the process of this invention, there can be produced a noble metal-supported article in which a palladium intermetallic compound in which the lattice of palladium has been replaced with a diverse metal or a palladium alloy in which palladium and a diverse metal have formed a solid solution is supported. In this invention, the palladium intermetallic compound and the palladium alloy are the palladium metal compounds as defined hereinbefore.

This invention is now explained below using as an example a process for producing a palladium-lead intermetallic compound effective as a catalyst to be used in the production of a carboxylic acid ester from an aldehyde and an alcohol by an oxidative carbonylation reaction in the presence of oxygen.

First of all, a soluble palladium compound such as palladium chloride or the like is insolubilized and immobilized on a carrier by the above-mentioned process for producing a noble metal-supported article of this invention. In this stage, the distribution of the palladium component has been controlled. Subsequently, using a solution of a soluble lead salt such as lead nitrate or the like, the lead component is supported on the carrier. By the subsequent reduction treatment, a palladium-lead intermetallic compound-supported article can be obtained. Moreover, the very high purity palladium-lead intermetallic compound catalyst of the invention exhibiting excellent performance in the carboxylic ester producing reaction can be effectively obtained by subjecting the supported palladium ions and lead ions to reduction treatment in the presence of both lead ions and at least one compound selected from the group consisting of $C_1$ to $C_5$ fatty acids, alkali metal salts and alkaline earth metal salts.

The principle of the production process of this invention is applied to palladium-lead intermetallic compounds comprising palladium and lead and a minor amount of at least one other diverse element, for example, mercury, thallium, bismuth, tellurium, nickel, chromium, cobalt, indium, tantalum, copper, zinc, zirconium, hafnium, tungsten, manganese, silver, rhenium, antimony, tin, rhodium, ruthenium, iridium, platinum, gold, titanium, aluminum, boron, silicon or the like, and according to a method based on the above principle, there can be obtained a palladium metal compound-supported article in which the metal distribution in the carrier has been controlled.

As the compounds of lead and mercury, thallium, bismuth, tellurium, nickel, chromium, cobalt, indium, tantalum, copper, zinc, zirconium, hafnium, tungsten, manganese, silver, rhenium, antimony, tin, rhodium, ruthenium, iridium, platinum, gold, titanium, aluminum, boron or silicon, there are mentioned organic acid salts, organic complexes, inorganic acid salts, hydroxides and the like. As the lead compound, there are suitable, for example, lead nitrate, lead acetate and the like.

Even in the palladium-lead intermetallic compound, the amount of palladium supported is not critical; however, it is usually 0.1 to 20% by weight, preferably 1 to 10% by weight, based on the weight of the carrier. The amount of lead supported is also not critical, and it is usually 0 to 20% by weight, preferably 1 to 10% by weight, based on the weight of the carrier.

In the case of a palladium-lead intermetallic compound which is particularly effective as a catalyst for obtaining a carboxylic acid ester from an aldehyde and an alcohol, important is the atomic ratio of the supported palladium and lead rather than the individual amounts of supported palladium and lead. That is to say, in the case of a palladium-lead intermetallic compound, the Pd/Pb atomic ratio of the catalyst obtained by supporting palladium and lead on a carrier is selected from the range of from 3/0.1 to 3/3, preferably from 3/0.1 to 3/2.0 and more preferably from 3/0.8 to 3/1.5.

As the $C_1$–$C_5$ fatty acid to be added in the reduction treatment step for forming the palladium-lead intermetallic compound, there can be used propionic acid, acetic acid, butyric acid, maleic acid, acrylic acid, methacrylic acid and the like; however, easily available acetic acid is preferred. The $C_1$–$C_5$ fatty acid can be added in an amount of preferably 0.1 to 30 moles, more preferably 1 to 15 moles, per mole of the supported palladium of the catalyst, and can be used within the range of the solubilities of lower fatty acids.

As the alkali or alkaline earth metal to be added in the reduction treatment step for forming the palladium-lead intermetallic compound, there can be used either hydroxides or fatty acid salts; however, fatty acid salts are preferred in view of operability and the like.

The reduction treatment for forming the palladium-lead intermetallic compound-supported article of this invention can be conducted at a temperature of room temperature to 200° C. When the temperature is not lower than the boiling point, the necessary pressure for keeping the liquid phase is applied. Preferably, the reduction is carried out under the conditions of room temperature to 160° C. and normal pressure to several atmospheres. Moreover, the time for the reduction treatment may be varied depending upon the treatment conditions; however, it is generally 0.5 to 5 hours. Usually, it is preferable to set the conditions so that the treatment is completed within 24 hours in view of the operability.

In the process of this invention, in addition to the palladium metal compound containing lead, there can be similarly used the palladium metal compounds containing bismuth, thallium, mercury, tellurium, copper, gold or the like as a metal species, thereby obtaining the palladium metal compound-supported article in which the distribution of these metals has been controlled on a carrier.

The metallic palladium-supported article and palladium metal compound-supported article obtained by the process of this invention can be broadly used as catalysts in catalytic reactions. They can be used as catalysts for such reactions as, for example, oxidative carboxylic ester-producing reactions between aldehydes and alcohols, partial hydrogenation of acetylenes to olefins, complete hydrogenation of acetylenes to paraffins, conversion of diolefins to monoolefins, selective hydrogenation of olefins, aliphatic dehalogenation, aromatic dehalogenation, reduction of acid chlorides, hydrogenation of aromatic nitro compounds to aromatic amines, hydrogenation of aromatic carbonyls, ring hydrogenation of benzoic acid, hydrogenation of phenol to cyclohexane, hydrogenation of aromatic ketones to aromatic alcohols, hydrogenation of aromatic ketones to alkyl aromatics, hydrogenolysis of aromatic carbonyls, decarbonylation of aromatic carbonyls, hydrogenation of aromatic nitrites to aromatic amines, hydrogenation of aromatic nitrites to aromatic aldehydes, disproportionation of cylohexene, transfer of olefins, reductive N-methylation of anilines, hydrogenation of aromatic nitro compounds to hydrazobenzene compounds, hydrogenation of nitrohexanes to cyclooxanones, hydrogenation of nitro-olefins to alkylamines, hydrogenation of oxams to primary amines, debenzylation, hydrogenation of epoxides to alcohols, reductive amination, hydrogenation of quinones to hydroquinones, ring hydrogenation of aromatic esters, hydrogenation of furan rings, ring hydrogenation of pyridine compounds, hydrogenation of nitric acid salts to hydroxylamines, hydrogenation of peroxides, hydrogenation of aliphatic nitro compounds, acetoxylation, carbonylation, dehydrogenation, dehydrogenation, liquid phase oxidation, deoxo reactions, oxidation of carbon monoxide, reduction of $NO_x$ and the like.

This invention is specifically explained below by way of Examples and Comparative Examples.

Measurement of palladium distribution by EPMA

A sample obtained by embedding the noble metal-supported article obtained in a resin and polishing the same was subjected to line analysis in the depth direction of a particle section under the following conditions using an X-ray microprobe (EPMA) (JXA-8800R, a trade name of JEOL Ltd.):

Accelerating voltage: 15 kV
Scan method: Stage scan
Measurement step space: 0.2–0.3 $\mu$m
Measurement time/step: 150 msec
Setting of electron beam diameter: 0 $\mu$m
Electron beam current value: 2×10–8A
Spectral crystal: Pd=PETH, Pb=PETH, Si=TAP Carrier Production Reference Example Aluminum nitrate and magnesium nitrate were added to SNOW TEX N-30 ($SiO_2$ content: 30% by weight) (a trade name of Nissan Chemical Industries, Ltd.) as a silica sol so that the Al/(Si+Al) proportion became 10 mole % and the Mg/(Si+Mg) proportion became 10 mole %, respectively, and dissolved therein, and thereafter, the resulting solution was spray-dried in a spray drier set at a temperature of 130° C. to obtain a spherical carrier having an average particle diameter of 60 $\mu$m. This spherical carrier was calcined in air at 300° C. for 2 hours and then at 600° C. for 3 hours. This was used as the carrier in this invention.

EXAMPLE 1

Palladium chloride was added to an aqueous solution of 15% by weight of palladium chloride and 10% by weight of sodium chloride with stirring so that the proportion of palladium became 5 parts by weight per 100 parts by weight of a carrier to completely dissolve the palladium chloride in the solution, and the temperature thereof was maintained at 90° C. Subsequently, the carrier in the dry state obtained in the Carrier Production Reference Example was instantly introduced into the above solution. Subsequently, the supernatant was decanted and the carrier on which palladium had been adsorbed was washed with distilled water several times. Distilled water was added to the washed carrier and to the resulting mixture which was being stirred at 90° C. was dropwise added an aqueous hydrazine solution with stirring in a proportion of 3 moles per mole of Pd over about 30 minutes. The resulting mixture was subjected to reduction treatment for 24 hours to obtain a palladium-supported catalyst.

Figure 1:
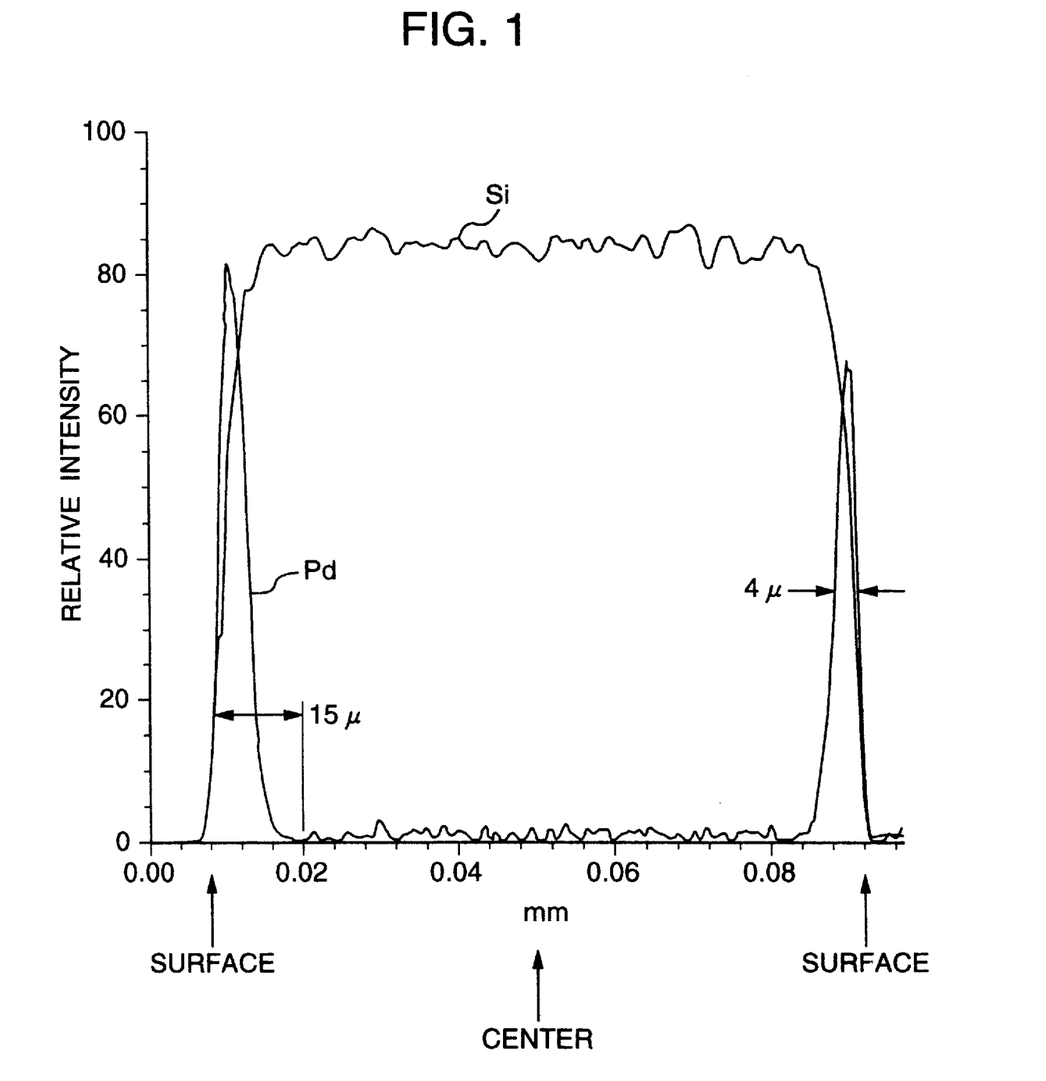
FIG. 1 shows the results of line analysis of the particle section of the palladium-supported catalyst in Example 1 using an X-ray microprobe.

The catalyst thus obtained was embedded in a resin and polished to prepare a sample and this sample was subjected to line analysis of a particle section using an X-ray microprobe (EPMA) (JXA-8800R, a trade name of JEOL Ltd.). The results obtained are shown in FIG. 1. As is clear from FIG. 1, it was confirmed that Pd was distributed and supported in the vicinity of the surface, namely, in the depth region of not more than 15 microns and was not present in the interior.

COMPARATIVE EXAMPLE 1

The same procedure as in Example 1 was repeated, except that the temperature for allowing palladium to be adsorbed was changed to room temperature, to obtain a palladium-supported catalyst.

Figure 2:
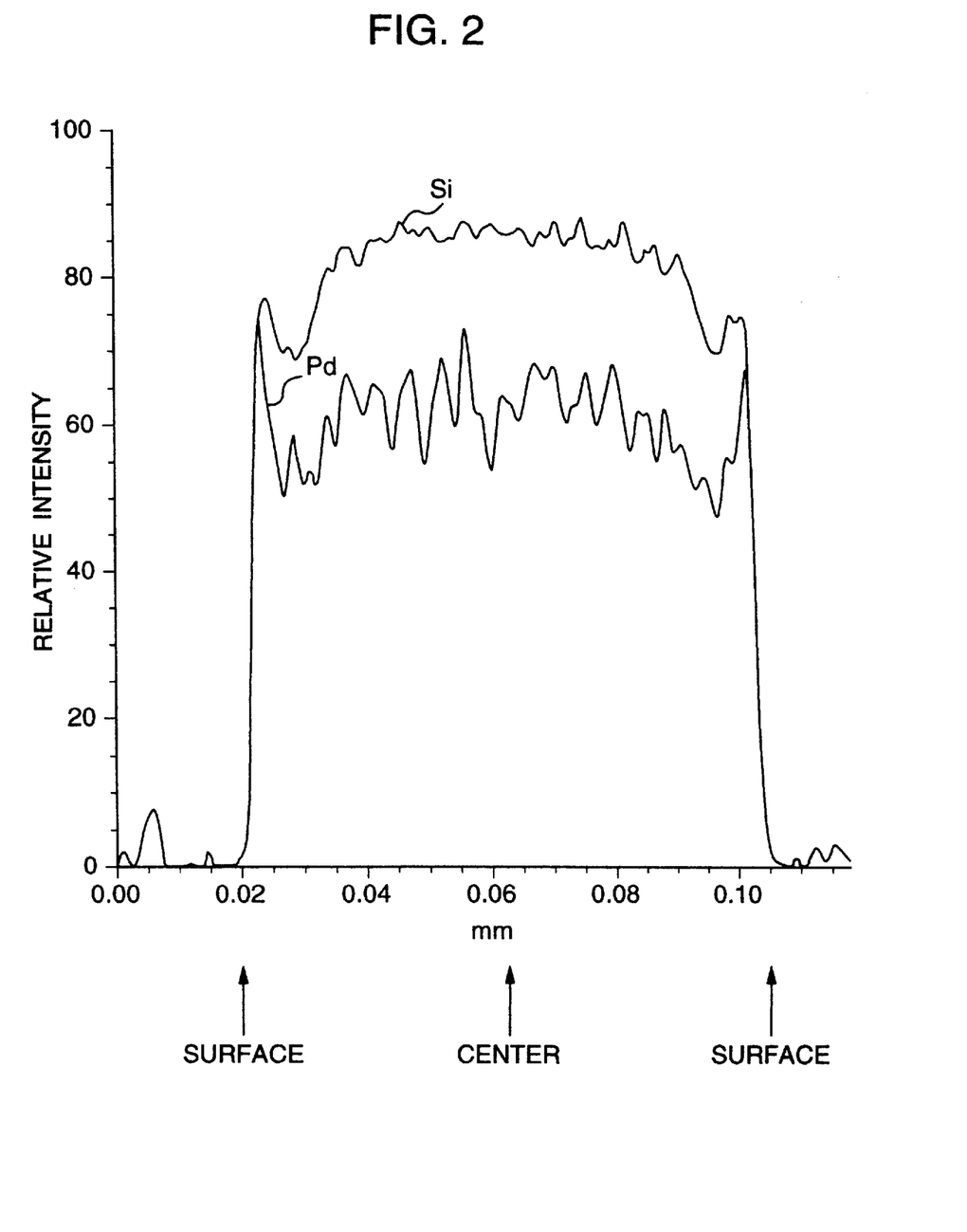
FIG. 2 shows the results of line analysis of the particle section of the palladium-supported catalyst in Comparative Example 2 using an X-ray microprobe.

The EPMA analysis results of the catalyst obtained are shown in FIG. 2. From FIG. 2, it was seen that Pd was uniformly distributed and supported from the surface to the interior of the carrier.

EXAMPLE 2

An aqueous aluminum nitrate solution in an amount corresponding to 0.35 part by weight of aluminum per 100 parts by weight of the carrier of Example 1 was heated to 90° C. and stirred, and the carrier in the dry state obtained in the Carrier Production Reference Example was instantly added thereto. The resulting mixture was stirred for a further 15 minutes at 90° C. Subsequently, to the mixture was instantly added an aqueous solution of 15% by weight of palladium chloride and 10% by weight of sodium chloride, which solution was heated to 90° C., in such an amount that the proportion of palladium became 5 parts by weight per 100 parts by weight of the carrier and the resulting mixture was stirred for a further one hour at 90° C. to allow the palladium chloride to be completely adsorbed on the carrier. Subsequently, the liquid was decanted and the carrier on which palladium had been adsorbed was washed with distilled water several times. Subsequently, the carrier thus obtained was introduced into a 18% by weight aqueous sodium acetate solution in such a proportion that the amount of sodium acetate became 18 times the amount of the palladium and the resulting mixture was stirred. Thereafter, lead acetate was added thereto in such an amount that Pd/Pb became 3/1.3 and the resulting mixture was stirred at 90° C. for about 30 minutes. Subsequently, an aqueous hydrazine solution was gradually dropwise added with stirring to the resulting mixture in such an amount that the proportion of hydrazine became 3 moles per mole of the total of Pd and Pb, and the resulting mixture was subjected to reduction treatment for 24 hours.

The catalyst thus obtained was analyzed by the above-mentioned method to find that it was a palladium-lead intermetallic compound whose X-ray diffraction angle (2 θ) at the maximum intensity peak in the powder X-ray diffraction pattern was 38.625°.

Figure 3:
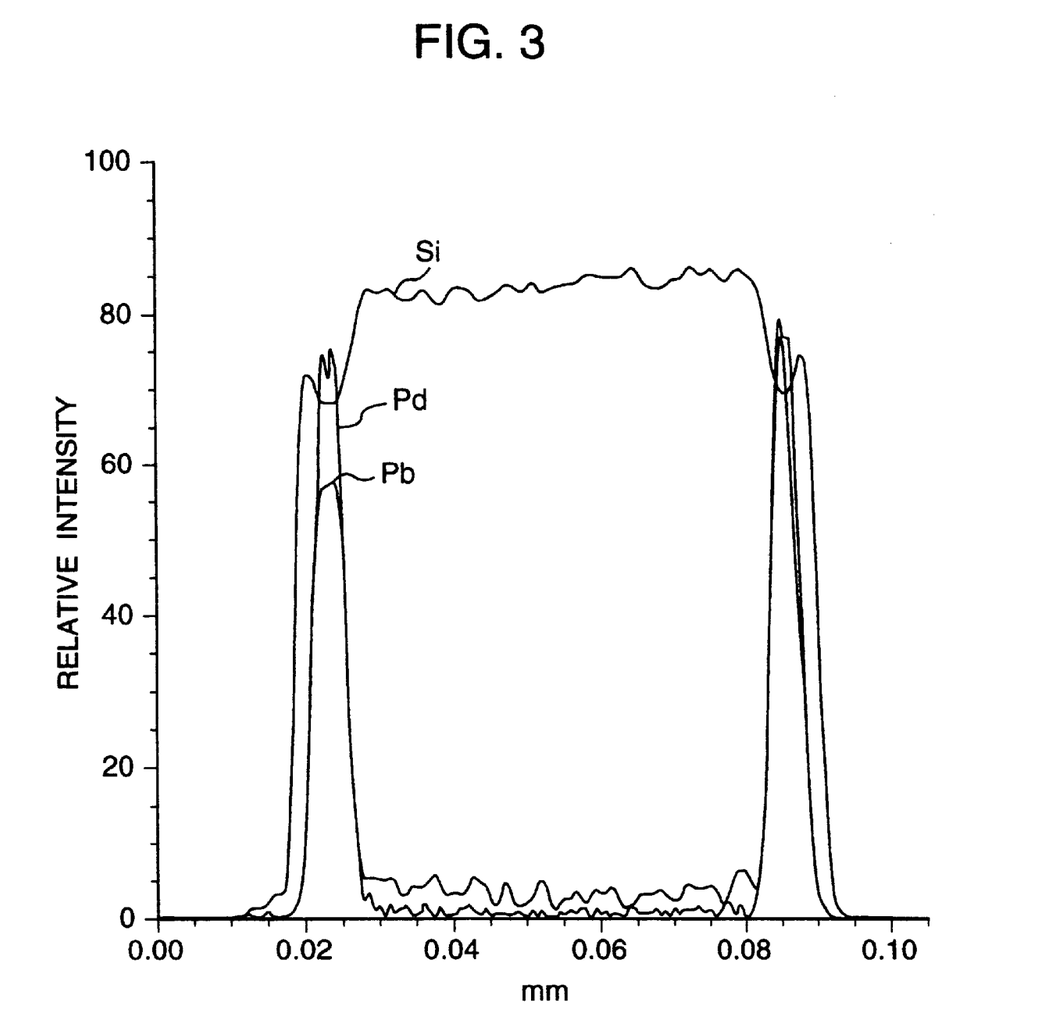
FIG. 3 shows the results of line analysis of the particle section of the palladium-supported catalyst in Example 2 using an X-ray microprobe.

The catalyst obtained was embedded in a resin and polished to obtain particles, and the particle thus obtained was subjected to line analysis of a particle section using an X-ray microprobe (EPMA) (JXA-8800R, a trade name of JEOL Ltd.). The results obtained are shown in FIG. 3. As is clear from FIG. 3, it was confirmed that Pd was not present in the region from the surface to a depth of 2 microns, was supported in the depth region of not less than 15 microns and was not present in the interior.

EXAMPLE 3

In a stirring type stainless steel reactor having a 1.2-liter liquid phase portion and provided with a catalyst separator was placed 200 g of the catalyst of Example 2, and an oxidative carboxylic ester-producing reaction between an aldehyde and an alcohol was carried out while the contents were stirred at such a rate that the tip speed of the stirring blade was 4 m/s. A 36.7% by weight methanolic methacrolein solution to which lead acetate had been added in such an amount that the concentration thereof in the reaction system became 30 ppm and a 2–4% by weight methanolic NaOH solution were continuously fed at 0.54 liter/hr and 0.06 liter/hr, respectively, to the reactor (the methacrolein concentration in the reaction system consisting of the above two solutions was about 33% by weight); air was blown thereinto so that the oxygen partial pressure at the outlet of the reactor became 0.2 atm. at a reaction temperature of 80° C. and at a reaction pressure of 5 kg/cm$^2$; and the concentration of NaOH fed to the reactor was controlled so that the pH of the reaction system became 7.1. The reaction product was continuously withdrawn by overflow from the outlet of the reactor and subjected to comparative evaluation by gas chromatography. After a lapse of 20 hours, the selectivity of methyl methacrylate (MMA) which was the objective product was 91.4% and the MMA production rate was 5.02 moles/hr/Kg-catalyst. After the reaction had been effected for 2,000 hours, the selectivity of methyl methacrylate (MMA) which was the objective product was 91.8% and the MMA production rate was 5.11 moles/hr/Kg-catalyst. Comparing the amount of Pd supported after 2,000 hours with the initial amount of Pd supported, it was found that the loss of palladium was 0.1% or less.

COMPARATIVE EXAMPLE 2

The reaction was conducted under the same operation conditions as in Example 3, except that the catalyst of Example 2 was changed to the catalyst of Comparative Example 1. After a lapse of 20 hours, the selectivity of methyl methacrylate (MMA) which was the objective product was 91.1% and the MMA production rate was 4.32 moles/hr/Kg-catalyst. The selectivity of methyl methacrylate (MMA) which was the objective product after the reaction had been effected for 2,000 hours was 91.3% and the MMA production rate was 3.89 moles/hr/Kg-catalyst. The catalyst was recovered and the amount of Pd supported after 2,000 hours was compared with the initial amount of Pd supported to find that the loss of palladium was 5.2%.

EXAMPLE 4

100 parts by weight of a silica gel carrier manufactured by Fuji Silicia (CARIACT-10, 150 μm in diameter) was introduced into an aqueous potassium acetate solution containing 5 parts by weight of potassium, and the resulting mixture was subjected to impregnation and drying. The mixture was further calcined at 600° C. for 3 hours in air. Subsequently, an aqueous aluminum nitrate solution containing 0.6 mole of aluminum per mole of palladium was heated to 90° C. and stirred, into which the carrier was momentarily introduced. The resulting mixture was stirred at 90° C. for a further 15 minutes. The temperature of the mixture was lowered to room temperature, at which temperature an aqueous solution of 15% by weight of palladium chloride and 10% by weight of sodium chloride was added to the mixture with stirring in such an amount that the proportion of palladium became 5 parts by weight per 100 parts by weight of the carrier, whereby palladium chloride was allowed to be completely adsorbed on the carrier. Subsequently, the liquid was decanted and the carrier on which palladium had been adsorbed was washed with distilled water several times. Distilled water was added thereto and the resulting mixture was stirred at 80° C., and to the mixture in this state was gradually dropwise added an aqueous hydrazine solution in such an amount that the proportion of hydrazine became 3 moles per mole of Pd with stirring over about 30 minutes and the resulting mixture was subjected to reduction treatment for 24 hours to obtain a palladium-supported catalyst.

The catalyst thus obtained was embedded in a resin and polished to obtain a sample, and this sample was subjected to line analysis of a particle section using an X-ray microprobe (EPMA) (JXA-8800R, a trade name of JEOL Ltd.) to determine the distribution of palladium, from which it was found that the carrier had a palladium-unsupported layer in the region from the surface to a depth of 5 microns, and palladium was supported in the depth region of 30 microns and was not present in the interior.

EXAMPLE 5

100 parts by weight of a spherical alumina carrier manufactured by Sumitomo Chemical Co., Ltd. (KHD, 3 mm in diameter) was introduced into an aqueous potassium nitrate solution containing 4 parts by weight of potassium and the resulting mixture was subjected to impregnation and drying, and further to calcination at 600° C. for 3 hours in air.

Subsequently, an aqueous solution of 15% by weight of palladium chloride and 10% by weight of sodium chloride was stirred at 70° C. and the carrier was instantly added thereto in such an amount that the proportion of palladium became 5 parts by weight per 100 parts by weight of the carrier, after which the resulting mixture was stirred for a further one hour at 70° C. Subsequently, the liquid was decanted, and the carrier on which palladium had been adsorbed was washed with distilled water several times. Distilled water was added to the carrier and the resulting mixture was stirred at 70° C. To the mixture in this state was gradually dropwise added an aqueous hydrazine solution in such an amount that the proportion of hydrazine became 3 moles per mole of Pd with stirring over about 30 minutes and the resulting mixture was subjected to reduction treatment for 24 hours to obtain a palladium-supported catalyst.

The catalyst thus obtained was embedded in a resin and polished to prepare a sample, and this sample was subjected to line analysis of a particle section using an X-ray microprobe (EPMA) (JXA-8800R, a trade name of JEOL Ltd.) to determine the distribution of palladium, from which it was found that in the carrier, palladium was supported in the region from the surface to a depth of 50 microns and was not present in the interior.

EXAMPLE 6

An aqueous solution having dissolved therein magnesium chloride in an amount equimolar to palladium was heated to 90° C. and stirred. Into this aqueous solution was instantly introduced the carrier in the dry state obtained in the Carrier Production Reference Example, and the resulting mixture was stirred at 90° C. for a further 10 minutes. The resulting carrier slurry maintained at a temperature of 90° C. was added with stirring to an aqueous solution of a mixture of 15% by weight of palladium chloride and 10% by weight of sodium chloride which solution contained 0.2 mole of aluminum per mole of palladium, in such a proportion that the amount of palladium became 3 parts by weight per 100 parts by weight of the carrier, to allow palladium to be completely adsorbed on the carrier. Thereafter, the liquid was decanted and the carrier on which palladium had been adsorbed was washed with distilled water several times and then 1-propanol was substituted for the distilled water. After the carrier was heated to 60° C., a 1-propanol solution of triphenylbismuth was added thereto in such an amount that the proportion of bismuth became 2.3 parts by weight per 100 parts by weight of the carrier, after which the resulting mixture was stirred. To the mixture in this state was gradually dropwise added a solution of hydrazine in 1-propanol in such an amount that the proportion of hydrazine became 3 moles per mole of Pd over about 30 minutes, and the resulting mixture was subjected to reduction treatment for 24 hours to obtain a palladium-bismuth-supported catalyst.

The catalyst thus obtained was embedded in a resin and polished to prepare a sample. This sample was subjected to line analysis of a particle section using an X-ray microprobe (EPMA) (JXA-8800R, a trade name of JEOL Ltd.), to find that the carrier had the Pd-unsupported layer in the region from the surface to a depth of 3 microns, and Pd was supported in the region from the surface to a depth of not more than 15 microns and was not present in the interior.

EXAMPLE 7

In a stirring type stainless steel reactor having a 1.2-liter liquid phase portion and provided with a catalyst separator was placed 200 g of the catalyst of Example 6, and an oxidative carboxylic ester-producing reaction between an aldehyde and an alcohol was carried out while the contents were stirred at such a rate that the tip speed of the stirring blade was 4 m/s. A 36.7% by weight methanolic acrolein solution to which lead acetate had been added so that the amount thereof in the reaction system became 20 ppm and a 2–4% by weight methanolic NaOH solution were continuously fed at 0.54 liter/hr and 0.06 liter/hr, respectively, to the reactor (the acrolein concentration in the reaction system consisting of the above two solutions was about 33% by weight); air was blown thereinto so that the oxygen partial pressure at the outlet of the reactor became 0.2 atm at a reaction temperature of 80° C. and at a reaction pressure of 5 kg/cm$^2$; and the concentration of NaOH fed to the reaction was controlled so that the pH of the reaction system became 7.1. The reaction mixture was continuously withdrawn by overflow from the outlet of the reactor and subjected to comparative evaluation by gas chromatography. After a lapse of 20 hours, the selectivity of methyl acrylate (MA) which was the objective product was 92.2% and the MA production rate was 5.92 moles/hr/Kg-catalyst. After the reaction had been effected for 2,000 hours, the selectivity of methyl acrylate (MA) which was the objective product was 92.6% and the MA production rate was 5.97 moles/hr/Kg-catalyst. Comparing the amount of Pd supported after 2,000 hours with the initial amount of Pd supported, it was found that the loss of palladium was 0.1% or less.

INDUSTRIAL APPLICABILITY

A noble metal-supported article having a high reaction activity can be obtained by supporting palladium or a palladium metal compound on a carrier in the vicinity of its surface. Moreover, a noble metal-supported article capable of inhibiting the loss of a palladium component due to abrasion or the like can be obtained by providing the outermost layer free from palladium. When the noble metal component is allowed to be supported on a carrier in the vicinity of its surface, the catalyst activity becomes high and the loss of the catalyst component becomes small as can be seen from the examples of the carboxylic ester-producing reaction between an aldehyde and an alcohol set forth above. Hence, a grate improvement is economics can be obtained not only with this specific reaction, as compared with conventional catalysts, but also more broadly with many reactions in general.

What is claimed is:

1. A noble metal-supported article which comprises a carrier particle having an outer surface and having a thickness or particle diameter of less than 200 $\mu$m and a palladium-containing metal component supported on the carrier, which article has (A) a portion in an interior of the carrier, in which portion substantially no palladium is supported and (B) a layer in a region from the outer surface to a depth of less than 80 $\mu$m from the outer surface, in which layer palladium is supported.

2. The noble metal-supported article according to claim 1, which has (C) an outermost layer which is at the outer surface of the carrier and in which substantially no palladium is supported, (B) a layer in a region from an inner side of said outermost layer (C) to a depth of less than 80 $\mu$m from the outer surface of the carrier in which layer palladium is supported, said layer being in contact with said outermost layer (C) and (A) a portion in an interior of the carrier in which portion substantially no palladium is supported.

3. The noble metal-supported article according to claim 1 or 2, wherein the palladium-containing metal component is palladium or a palladium metal compound.

4. The noble metal-supported article according to claim 1, wherein the palladium metal compound is a compound in which part of the crystal lattice of palladium has been replaced with bismuth.

5. The noble metal-supported article according to claim 1, wherein the palladium metal compound is a compound in which part of the crystal lattice of palladium has been replaced with lead.

6. A noble metal-supported article according to claim 2, wherein layer (C) is not present.

7. A process for producing the noble metal-supported article according to claim 6 which comprises instantly introducing a dried and/or calcined carrier obtained by drying and/or calcining a carrier containing a soluble salt of at least one metal selected from the group consisting of alkali metals, alkaline earth metals and rare earth metals into a palladium compound solution maintained at a temperature of not less than 70° C. in an excessive amount 5–200 times as much as the amount of palladium supported.

8. A process for producing the noble metal-supported article according to claim 1 which comprises instantly introducing a dried and/or calcined carrier obtained by drying and/or calcining a carrier containing a soluble salt of at least one metal selected from the group consisting of alkali metals, alkaline earth metals and rare earth metals into an aluminum compound solution maintained at a temperature of not less than 70° C. in an excess amount 5–200 times as much as the amount of palladium supported and thereafter instantly introducing the resulting mixture into a palladium compound solution maintained at a temperature of not less than 70° C., or instantly introducing the above dried and/or calcined carrier into a solution of a mixture of an aluminum compound and a palladium compound maintained at a temperature of not less than 70° C.

9. A process for producing the noble metal-supported article according to claim 6, which comprises dispersing a dried and/or calcined carrier obtained by drying and/or calcining a carrier containing a soluble salt of at least one metal selected from the group consisting of alkali metals, alkaline earth metals and rare earth metals in an excessive amount 5–200 times as much of palladium supported in a solution containing a salt of at least one metal selected from the group consisting of alkali metals, alkaline earth metals and rare earth metals and then contacting the resulting dispersion with a palladium compound solution at a temperature of not less than 70° C.

10. A process for producing the noble metal-supported article according to claim 2, which comprises dispersing a dried and/or calcined carrier obtained by drying and/or calcining a carrier containing a soluble salt of at least one metal selected from the group consisting of alkali metals, alkaline earth metals and rare earth metals in an excessive amount 5–200 times as much as the amount of palladium supported in a solution containing a salt of at least one metal selected from the group consisting of alkali metals, alkaline earth metals and rare earth metals and then contacting the resulting dispersion firstly with an aluminum compound solution at a temperature of not less than 70° C. and secondly with a palladium compound solution at a temperature of not less than 70° C., or contacting the above dispersion with a solution of a mixture of a palladium compound and an aluminum compound at a temperature of not less than 70° C.

11. A process for producing an acrylic acid ester and/or a methacrylic acid ester, which comprises reacting an alcohol with acrolein and/or methacrolein in the presence of oxygen using the noble metal-supported article according to claim 1 or 2 as a catalyst.

* * * * *